United States Patent
Kobayashi (10) Patent No.: US 6,517,144 B2
(45) Date of Patent: Feb. 11, 2003

(54) UPPER BODY STRUCTURE OF MOTOR VEHICLE

(75) Inventor: Yasuo Kobayashi, Toyota (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 09/855,729

(22) Filed: May 16, 2001

(65) Prior Publication Data

US 2001/0042988 A1 Nov. 22, 2001

(30) Foreign Application Priority Data

May 17, 2000 (JP) ........................................ 2000-145097

(51) Int. Cl.⁷ ............................................... B60R 21/04
(52) U.S. Cl. ...................... 296/189; 296/39.1; 296/214; 280/751
(58) Field of Search .................... 296/39.1, 214, 296/188, 189, 203.03; 280/751, 748

(56) References Cited

U.S. PATENT DOCUMENTS 6,120,090 A * 9/2000 Van Ert et al. ............. 280/751
6,302,477 B1 * 10/2001 Satou .......................... 280/751
6,315,350 B1 * 11/2001 Nakane et al. .............. 280/751
6,367,872 B1 * 4/2002 Bohm et al. ................. 296/210
2001/0019201 A1 * 9/2001 Masuda et al. ........... 280/730.2

FOREIGN PATENT DOCUMENTS

| JP | 7-187008 | 7/1995 |
| JP | 10-338082 | 12/1998 |
| JP | 2000-177516 | 6/2000 |

* cited by examiner

Primary Examiner—D. Glenn Dayoan
Assistant Examiner—Patricia L. Engle
(74) Attorney, Agent, or Firm—Finnegan, Henderson, Farabow, Garrett & Dunner, L.L.P.

(57) ABSTRACT

An impact absorbing member is composed of a first impact absorbing portion disposed between a roof side panel and a roof head lining, a second impact absorbing portion disposed between the roof head lining and a region that is in a reinforcement and that is spaced from the roof side panel towards a central portion of the roof, and a third impact absorbing portion connecting the first impact absorbing portion to the second impact absorbing portion. The third impact absorbing portion is thinner than the first impact absorbing portion and the second impact absorbing portion.

15 Claims, 5 Drawing Sheets

UPPER BODY STRUCTURE OF MOTOR VEHICLE

INCORPORATION BY REFERENCE

The disclosure of Japanese Patent Application No. 2000-145097 filed on May 17, 2000 including the specification, drawings, and abstract is incorporated herein by reference in its entirety.

BACKGROUND OF THE INVENTION

1. Field of the Invention

The invention relates to an upper body structure of a motor vehicle, more particularly, to an upper body structure of a motor vehicle or the like with an impact absorbing member disposed therein.

2. Description of Related Art

Japanese Patent Application Laid-pen No. HEI 7-187008 discloses an example of an upper body structure of a motor vehicle or the like with an impact absorbing member disposed therein.

Figure 5:
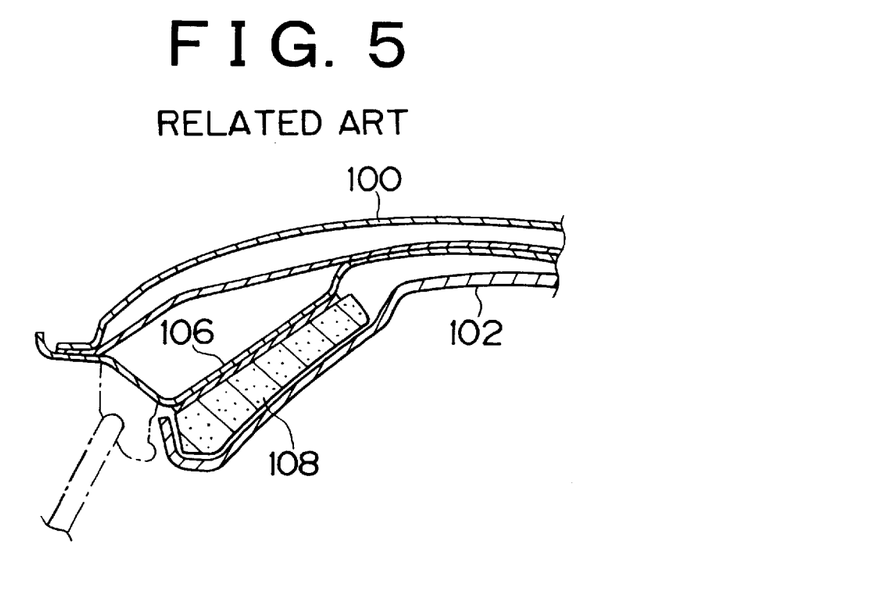
FIG. 5 is a side sectional view showing an upper body structure of a motor vehicle.

As shown in FIG. 5, Japanese Patent Application Laid-Open No. HEI 7-187008 discloses an upper body structure of a motor vehicle wherein a roof head lining 102 such as a fabric and so on is spread over a region of a roof 100 provided over a passenger compartment of the vehicle, and wherein a buffer 108 is interposed between a roof side portion 106 and a roof head lining 102 that is located in a side portion of a ceiling.

Figure 6:
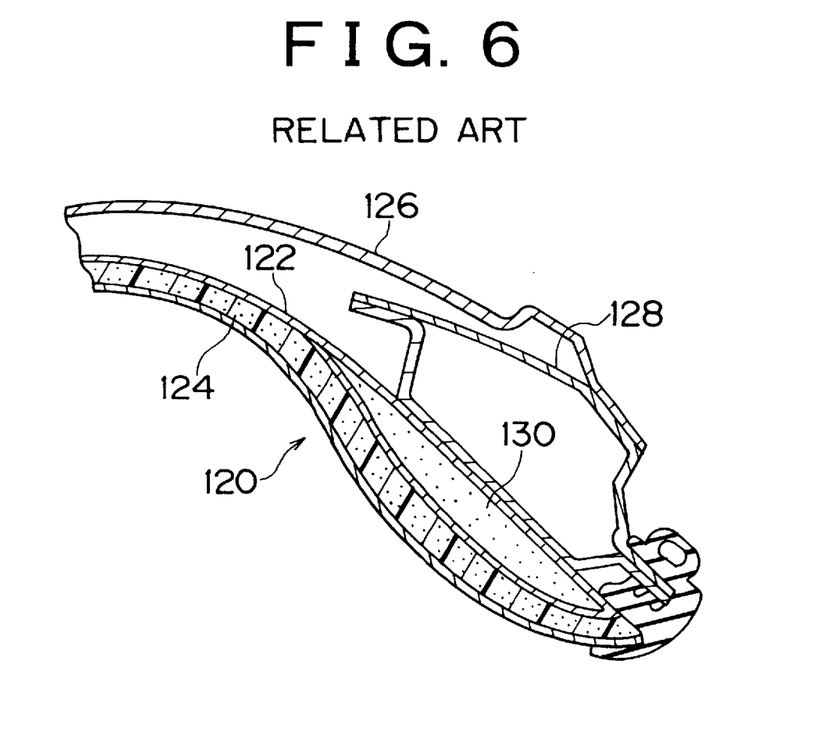
FIG. 6 is a side sectional view showing an upper body structure of a motor vehicle.

As shown in FIG. 6, according to a structure disclosed in Japanese Patent Application Laid-Open No. HEI 10-338082, a back plate 122 that has been formed with relatively high rigidity and a foam plate 124 that is securely adhered to the back plate 122 and that is relatively likely to be deformed are provided in a roof head lining 120, and an elastically deformable foam strip 130 is provided in a region that is in the roof head lining 120 and that is in contact with a roof side rail 128. Thus, the rigid roof side rail 128 is prevented from hindering the energy absorbing function of the foam plate 124.

However, in the above-described upper body structures, in a case where a passenger bumps his or her head against a central side of the roof side rail, and bumps his or her chin against a region where an impact absorbing member is disposed, such as the buffer 108, the foam strip 130, etc., is taken into account, it is preferred that the deformation load of the impact absorbing member be set at a low value and that the acceleration applied to the head of the passenger be reduced. Therefore, it is desirable to provide an upper body structure of a motor vehicle capable of minimizing the amount of disposal of an impact absorbing member and absorbing impact reliably.

SUMMARY OF THE INVENTION

It is an object of the invention to obtain an upper body structure of a motor vehicle capable of minimizing the amount of disposal of an impact absorbing member and absorbing impact reliably.

According to a first aspect of the invention, an upper body structure of a motor vehicle comprises a roof, a ceiling member disposed over a passenger compartment at a predetermined distance from the roof, and an impact absorbing member that is disposed within the predetermined distance and that absorbs an impact resulting from a load from the inside of the passenger compartment. The impact absorbing member has a first impact absorbing portion disposed between an outer peripheral portion of the roof and the ceiling member, a second impact absorbing portion disposed between the ceiling member and a position spaced from the outer peripheral portion of the roof towards a central portion of the roof, and a third impact absorbing portion that connects the first impact absorbing portion to the second impact absorbing portion and that is thinner than the first impact absorbing portion and the second impact absorbing portion.

Accordingly, in the case where the region of the ceiling member where the impact absorbing member is disposed is pressed from the inside of the passenger compartment, the first impact absorbing portion is supported by the outer peripheral portion of the roof, and the second impact absorbing portion is supported by the position spaced from the outer peripheral portion of the roof towards the central portion of the roof. As described above, the third impact absorbing portion connects the first impact absorbing portion to the second impact absorbing portion. Thus, the impact absorbing member is supported at two points. Therefore, the impact absorbing member is surely crushed where it is disposed, without moving or rotating. Thus, stable impact absorption is achieved. Further, since the third impact absorbing portion is thinner than the first impact absorbing portion and the second impact absorbing portion, the amount of disposal of the impact absorbing member can be minimized.

According to a second aspect of the invention, an upper body structure of a motor vehicle comprises a roof having a roof side portion, a ceiling member disposed over a passenger compartment at a predetermined distance from the roof, and an impact absorbing member that is disposed within the predetermined distance and that absorbs an impact resulting from a load from the inside of the passenger compartment. The impact absorbing member has a first impact absorbing portion disposed between the roof side portion and the ceiling member, a second impact absorbing portion disposed between the ceiling member and a position spaced from the roof side portion towards a central portion of the roof, and a third impact absorbing portion that connects the first impact absorbing portion to the second impact absorbing portion and that is thinner than the first impact absorbing portion and the second impact absorbing portion.

Accordingly, in the case where the region of the ceiling member where the impact absorbing member is disposed is pressed from the inside of the passenger compartment, the first impact absorbing portion is supported by the roof side portion, and the second impact absorbing portion is supported by the position spaced from the roof side portion towards the central portion of the roof. As described above, the third impact absorbing portion connects the first impact absorbing portion to the second impact absorbing portion. Thus, the impact absorbing member is supported at two points. Therefore, the impact absorbing member is surely crushed where it is disposed, without moving or rotating. Thus, stable impact absorption is achieved. Further, since the third impact absorbing portion is thinner than the first impact absorbing portion and the second impact absorbing portion, the amount of disposal of the impact absorbing member can be minimized.

In the first and second aspects, the third impact absorbing portion may be in contact with the ceiling member.

In the case where the third impact absorbing portion is in contact with the ceiling member, the impact absorbing member can adhere to the ceiling member over an increased area, and the mountability thereof is improved. Regions of the first and second impact absorbing portions on the side of the roof can be easily deformed towards the thin third impact absorbing portion. Therefore, the crushing widths of the first and second impact absorbing portions are increased, and the stroke of the ceiling member can be increased.

In the above-described aspects, the first impact absorbing portion has a surface facing the roof and a surface facing the ceiling member, and the surface facing the roof may be smaller than the surface facing the ceiling member.

Thus, in the first impact absorbing portion of the impact absorbing member, a load from the inside of the passenger compartment can be received by the greater surface, and the load can be conveyed to the roof portion by the smaller surface. As a result, the load from the inside of the passenger compartment can be reliably supported by the roof side portion or the outer peripheral portion of the roof that has high rigidity.

DETAILED DESCRIPTION OF PREFERRED EMBODIMENTS

An upper body structure of a motor vehicle according to a first embodiment of the invention will be described with reference to FIGS. 1 and 2. In the drawings, it is to be noted that an arrow FR indicates a front direction with respect to the vehicle, that an arrow IN indicates a widthwise inward direction with respect to the vehicle, and that an arrow UP indicates an upward direction with respect to the vehicle.

Figure 1:
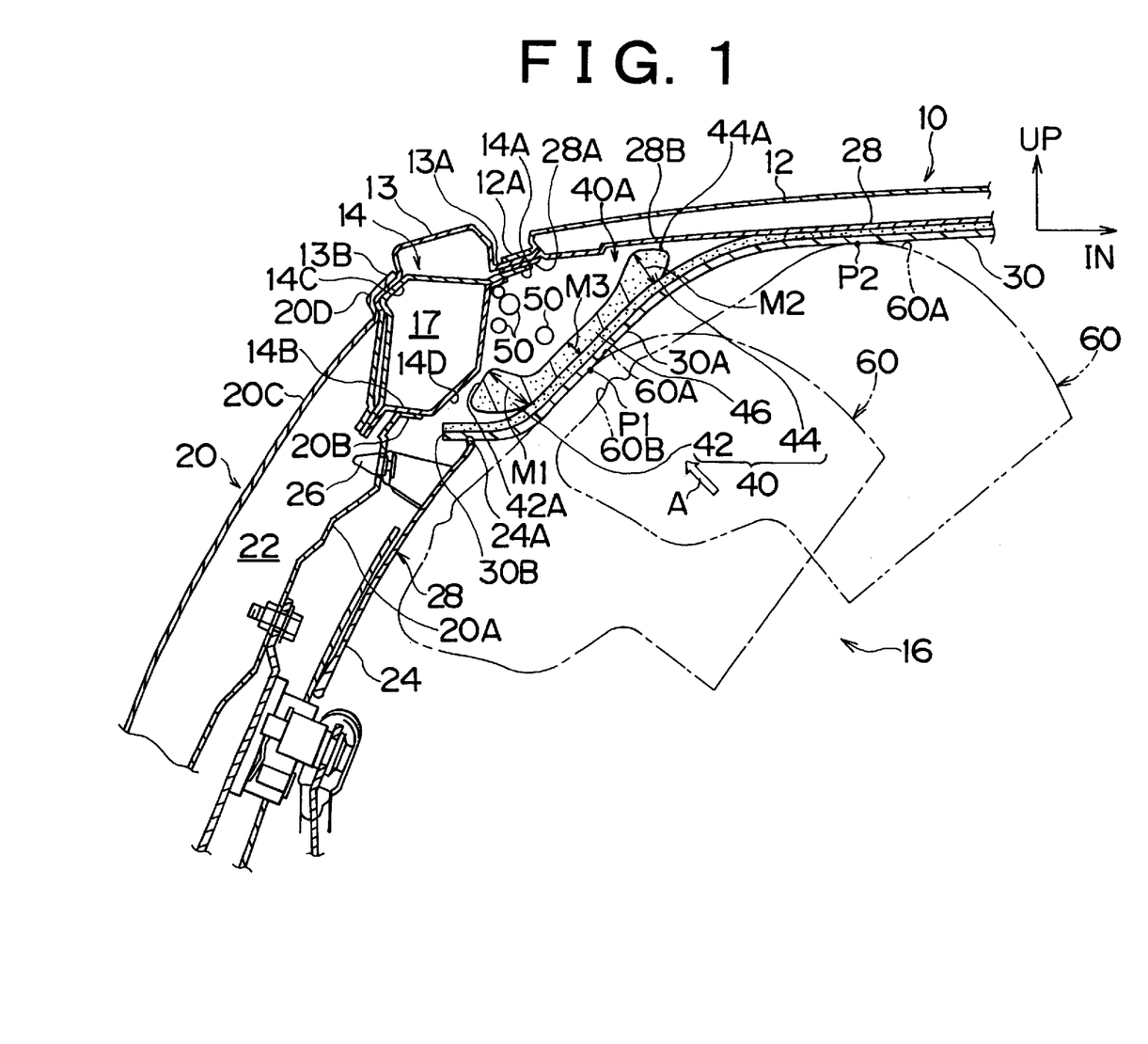
FIG. 1 is a cross-sectional view taken along a line I—I shown in FIG. 2.

As shown in FIG. 1, in this embodiment, a widthwise outward end 12A of a roof panel 12 constituting an outer plate portion of a roof 10 of a vehicle body is welded to an upper flange 14A of a roof side rail 14, with a flange 13A of a roof drip channel 13 sandwiched therebetween. The roof side rail 14 constitutes a closed sectional portion 17 that extends in the longitudinal direction with respect to the vehicle body, in a widthwise outward upper portion of a passenger compartment 16, and is a skeletal member constituting an upper side portion of the passenger compartment 16.

A flange 20B that is formed at an upper end of an inner wall portion 20A of a center pillar panel 20 that extends substantially vertically in a side portion of the passenger compartment 16 is welded to a lower wall 14B of an inner wall portion 14D that is inward of the roof side rail 14 with respect to the passenger compartment 16. A flange 20D that is formed at an upper end of an outer wall portion 20C of the center pillar panel 20 is welded to an outer wall portion 14C that is outward of the roof side rail 14, with a stepped portion 13B of the roof drip channel 13 sandwiched therebetween. The center pillar panel 20 constitutes a closed sectional portion 22 that extends substantially vertically, and is a skeletal member constituting a side portion of the passenger compartment 16. A center pillar garnish 24 is fitted to the inner wall portion 20A of the center pillar panel 20 by means of a clip 26.

A center roof panel reinforcement 28 that extends widthwise along a side face of the roof panel 12 in the passenger compartment 16 (hereinafter referred to as the reinforcement 28) is disposed at each of left and right regions for connecting the center pillar panel 20. A widthwise outward end 28A of the reinforcement 28 is sandwiched between the widthwise outward end 12A of the roof panel 12 and the upper flange 14A of the roof side rail 14.

A roof head lining 30 as a ceiling member is disposed inward of the roof panel 12 with respect to the passenger compartment 16, with a predetermined clearance. The reinforcement 28 is disposed between the roof panel 12 and the roof head lining 30.

A widthwise outward portion 30A of the roof head lining 30 is curved diagonally downwards, and a lower end 30B of the widthwise outward portion 30A almost reaches the flange 20B of the center pillar panel 20. The lower end 30B of the roof head lining 30 is engaged with an upper end 24A of the center pillar garnish 24.

Figure 2:
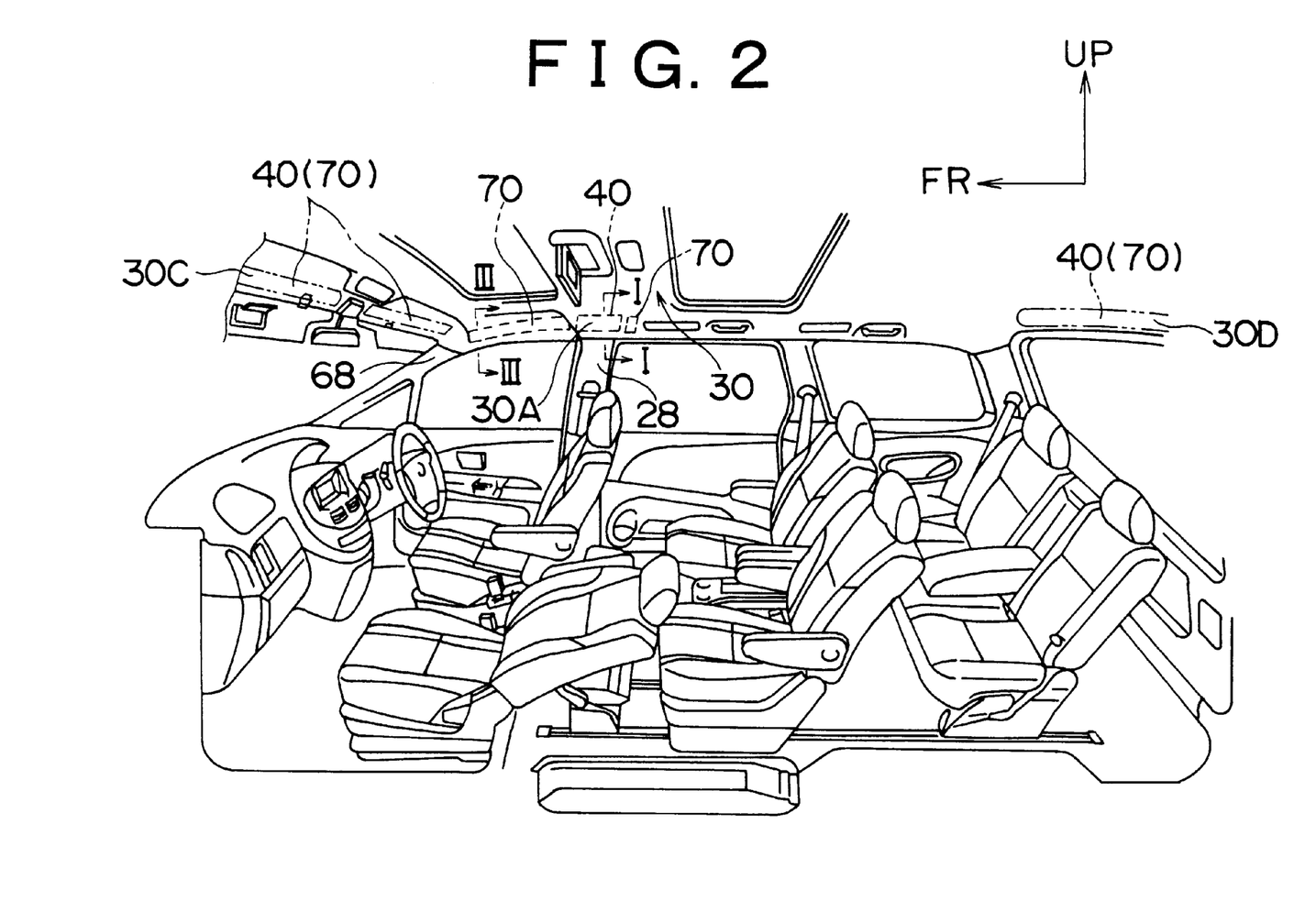
FIG. 2 is a perspective view of a vehicle body to which an upper body structure of a motor vehicle according to the invention is applied, viewed from a position diagonally forward of the vehicle.

As shown in FIG. 2, an impact absorbing member 40 is disposed in the widthwise outward portion 30A of the roof head lining 30, in a region above the center pillar 28.

As shown in FIG. 1, the impact absorbing member 40 is fixed to a surface that is in the widthwise outward portion 30A of the roof head lining 30 and outward of the passenger compartment 16, by means of a hot-melt adhesive or the like. The impact absorbing member 40 is formed from urethane foam or the like and absorbs an impact from the inside of the passenger compartment 16.

The impact absorbing member 40 is composed of a first impact absorbing portion 42 disposed between the inner wall portion 14D of the roof side rail 14 and the roof head lining 30, a second impact absorbing portion 44 disposed between the roof head lining 30 and a region 28B of the reinforcement 28 that is spaced from the roof side rail 14 towards a central portion of the roof, and a third impact absorbing portion 46 that connects the first impact absorbing portion 42 to the second impact absorbing portion 44.

The first impact absorbing portion 42 swells towards the inner wall portion 14D of the roof side rail 14 and has a surface 42A that faces the roof side rail 14 and that is substantially parallel to the inner wall portion 14D of the roof side rail 14. The second impact absorbing portion 44 swells towards the region 28B of the reinforcement 28 and has a surface 44A that faces the reinforcement 28 and that is substantially parallel to the region 28B of the reinforcement 28. The third impact absorbing portion 46 has a thickness M3 that is smaller than a thickness M1 of the first impact absorbing portion 42 and a thickness M2 of the second impact absorbing portion 44. The third impact absorbing portion 46 abuts on the roof head lining 30.

Thus, a recess 40A with its opening directed outward of the passenger compartment 16 is formed in the impact absorbing member 40. A part of a wire harness 50 and so on can be disposed in the recess 40A.

Next, operation of this embodiment will be described.

If a forehead 60A of a passenger 60 comes into abutment on a region P1 that is in the roof head lining 30 and that faces the third impact absorbing portion 46 of the impact absorbing member 40 from a lower position inward of the passenger compartment (along an arrow A shown in FIG. 1) as indicated by an alternate long and short dash line in FIG. 1, or if the forehead 60A of the passenger 60 comes into abutment on a widthwise central region P2 of the roof head lining 30 and a chin 60B of the passenger 60 comes into abutment on a position near the region P1 of the roof head lining 30 from a lower position inward of the passenger compartment (along the arrow A shown in FIG. 1) as indicated by an alternate long and two short dashes line in FIG. 1, the widthwise outward portion 30A of the roof head lining 30, in which the impact absorbing member 40 is disposed, is pressed from the inside of the passenger compartment. At this moment, the surface 42A of the first impact absorbing portion 42 abuts on and is supported by the inner wall portion 14D of the roof side rail 14, and the surface 44A of the second impact absorbing portion 44 abuts on and is supported by the region 28B that is in the reinforcement 28 and that is spaced from the roof side rail 14 towards the central portion of the roof. As described above, the third impact absorbing portion 46 connects the first impact absorbing portion 42 to the second impact absorbing portion 44.

As a result, the impact absorbing member 40 is supported at two points that are spaced from each other widthwise with respect to the vehicle body. Therefore, the impact absorbing member 40 is surely crushed where it is disposed, without moving or rotating. Thus, stable impact absorption is achieved.

In this embodiment, since the third impact absorbing member 46 is thinner than the first impact absorbing portion 42 and the second impact absorbing portion 44, the amount of disposal of the impact absorbing member 40 can be reduced to a minimum required amount. As a result, the deformation load applied to the impact absorbing member 40 can be set at a low value, and the acceleration applied to the head of the passenger can be reduced.

Further, the impact absorbing member 40 can be reduced in weight, and a part of the wire harness 50 and so on can be disposed in the recess 40A of the impact absorbing member 40. Furthermore, since swelling deformation of urethane foam after its forming can be reduced, the geometrical precision of the impact absorbing member 40 is improved. Therefore, the mountability of the impact absorbing member 40 to the vehicle body is improved.

Further, in this embodiment, the third impact absorbing portion 46 of the impact absorbing member 40 is in contact with the roof head lining 30. Therefore, the impact absorbing member 40 can adhere to the roof head lining 30 over an increased area, and the mountability thereof is further improved. When the impact absorbing member 40 is crushed, a region close to the surface 42A of the first impact absorbing portion 42 and a region close to the surface 44A of the second impact absorbing portion 44 can be easily deformed into the recess 40A of the third impact absorbing portion 46 that is thinner than the first impact absorbing portion 42 and the second impact absorbing portion 44. Therefore, the crushing widths of the first impact absorbing portion 42 and the second impact absorbing portion 44 are increased, and the deformation stroke of the roof head lining 30 can be increased.

Further, in this embodiment, since the first impact absorbing portion 42 abuts on the roof side rail 14 and the second impact absorbing portion 44 abuts on the reinforcement 28, a load from the inside of the passenger compartment can be surely supported by the roof side rail 14 and the reinforcement 28 that are high in rigidity.

Next, an upper body structure of a motor vehicle according to a second embodiment of the invention will be described with reference to FIGS. 2 and 3.

Members identical with those of the first embodiment are denoted by the same reference numerals, and the description thereof will be omitted.

As shown in FIG. 2, in this embodiment, an impact absorbing member 70 is disposed in each of a region that is in the widthwise outward portion 30A of the roof head lining 30 and that is between the center pillar 28 and a front pillar 68 and a region that is close to a position behind the center pillar 28.

Figure 3:
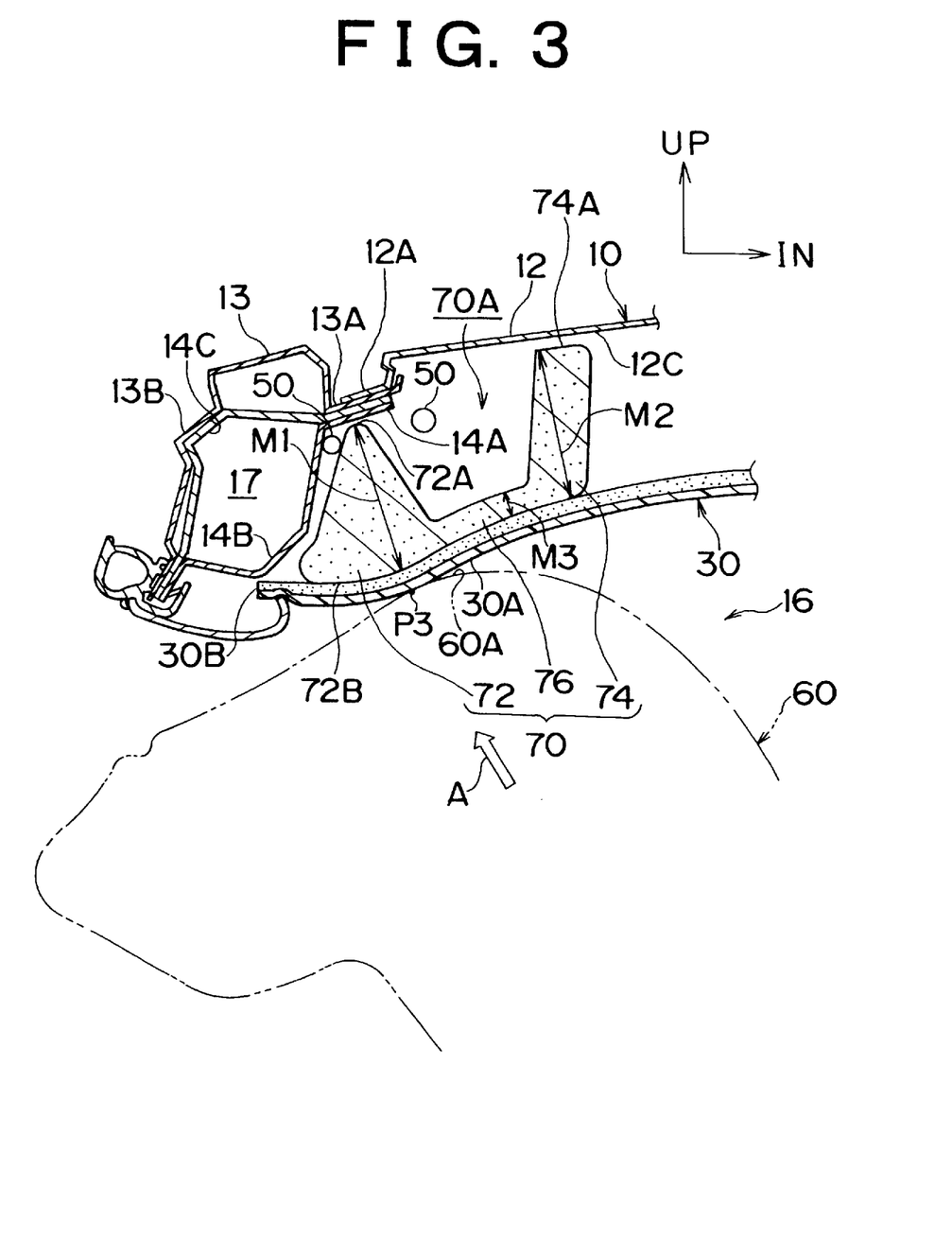
FIG. 3 is a cross-sectional view taken along a line III—III shown in FIG. 2 according to a second embodiment of the invention.

As shown in FIG. 3, the impact absorbing member 70 is fixed to a surface that is in the widthwise outward portion 30A of the roof head lining 30 and that is outward of the passenger compartment 16, by means of a hot-melt adhesive or the like. The impact absorbing member 70 is formed from urethane foam and absorbs an impact from the inside of the passenger compartment 16.

The impact absorbing member 70 is composed of a first impact absorbing portion 72 that is disposed between the upper flange 14A of the roof side rail 14 and the roof head lining 30, a second impact absorbing portion 74 that is disposed between the roof head lining 30 and a region 12C that is in the roof panel 12 and that is spaced from the upper flange 14A of the roof side rail 14 towards a central portion of the roof, and a third impact absorbing portion 76 that connects the first impact absorbing portion 72 to the second impact absorbing portion 74.

The first impact absorbing portion 72 is generally triangular in section when viewed in the longitudinal direction of the vehicle body, and has a surface 72A that faces the upper flange 14A of the roof side rail 14 and a surface 72B that faces the roof head lining 30. The surface 72A is smaller than the surface 72B. The second impact absorbing portion 74 is generally quadrate in section and protrudes above the vehicle body when viewed in the longitudinal direction thereof. The second impact absorbing portion 74 has a surface 74A that faces the roof panel 12 and that is substantially parallel to the region 12C of the roof panel 12. The third impact absorbing portion 76 has a thickness M3 that is smaller than a thickness M1 of the first impact absorbing portion 72 and a thickness M2 of the second impact absorbing portion 74. The third impact absorbing portion 76 abuts on the roof head lining 30.

Thus, a recess 70A is formed in the impact absorbing member 70, and a part of the wire harness 50 and so on can be disposed in the recess 70A.

Next, operation of this embodiment will be described.

In this embodiment, if the forehead 60A of the passenger 60 comes into abutment on a region P3 that is in the roof head lining 30 and that faces the first impact absorbing portion 72 of the impact absorbing member 70 from a lower position inward of the passenger compartment 16 (along an arrow A shown in FIG. 3) as indicated by an alternate long and two short dashes line in FIG. 3, and if the widthwise outward portion 30A of the roof head lining 30, in which the impact absorbing member 70 is disposed, is pressed from the inside of the passenger compartment 16, the surface 72A of the first impact absorbing portion 72 abuts on and is supported by the upper flange 14A of the roof side rail 14, and the surface 74A of the second impact absorbing portion 74 abuts on and is supported by the region 12C of the roof panel 12. As described above, the third impact absorbing portion 76 connects the first impact absorbing portion 72 to the second impact absorbing portion 74.

As a result, the impact absorbing member 70 is supported at two points that are spaced from each other widthwise with respect to the vehicle body. Therefore, the impact absorbing member 70 is surely crushed where it is disposed, without moving or rotating. Thus, stable impact absorption is achieved.

In this embodiment, since the third impact absorbing member 76 is thinner than the first impact absorbing portion 72 and the second impact absorbing portion 74, the amount of disposal of the impact absorbing member 70 can be reduced to a minimum required amount. As a result, the deformation load applied to the impact absorbing member 70 can be set at a low value, and the acceleration applied to the head of the passenger can be reduced.

Further, the impact absorbing member 70 can be reduced in weight, and a part of the wire harness 50 and so on can be disposed in the recess 70A of the impact absorbing member 70. Furthermore, since swelling deformation of urethane foam after its forming can be reduced, the geometrical precision of the impact absorbing member 70 is improved. Therefore, the mountability of the impact absorbing member 70 to the vehicle body is improved.

Further, in this embodiment, the third impact absorbing portion 76 of the impact absorbing member 70 is in contact with the roof head lining 30. Therefore, the impact absorbing member 70 can adhere to the roof head lining 30 over an increased area, and the mountability thereof is further improved. When the impact absorbing member 70 is crushed, a region close to the surface 72A of the first impact absorbing portion 72 and a region close to the surface 74A of the second impact absorbing portion 74 can be easily deformed into the recess 70A of the third impact absorbing portion 76 that is thinner than the first impact absorbing portion 72 and the second impact absorbing portion 74. Therefore, the crushing widths of the first impact absorbing portion 72 and the second impact absorbing portion 74 are increased, and the deformation stroke of the roof head lining 30 can be increased.

Further, in this embodiment, the first impact absorbing portion 72 of the impact absorbing member 70 is generally triangular in section when viewed in the longitudinal direction of the vehicle body, and the surface 72A that faces the upper flange 14A of the roof side rail 14 is smaller than the surface 72B that faces the roof head lining 30. As a result, the first impact absorbing portion 72 receives a load from the inside of the passenger compartment 16 with the surface 72B that is wide. The load can be conveyed to the upper flange 14A of the roof side rail 14 by the surface 72A. Therefore, a load from the inside of the passenger compartment 16 can be surely supported by the upper flange 14A of the roof side rail 14 that is high in rigidity.

Figure 4:
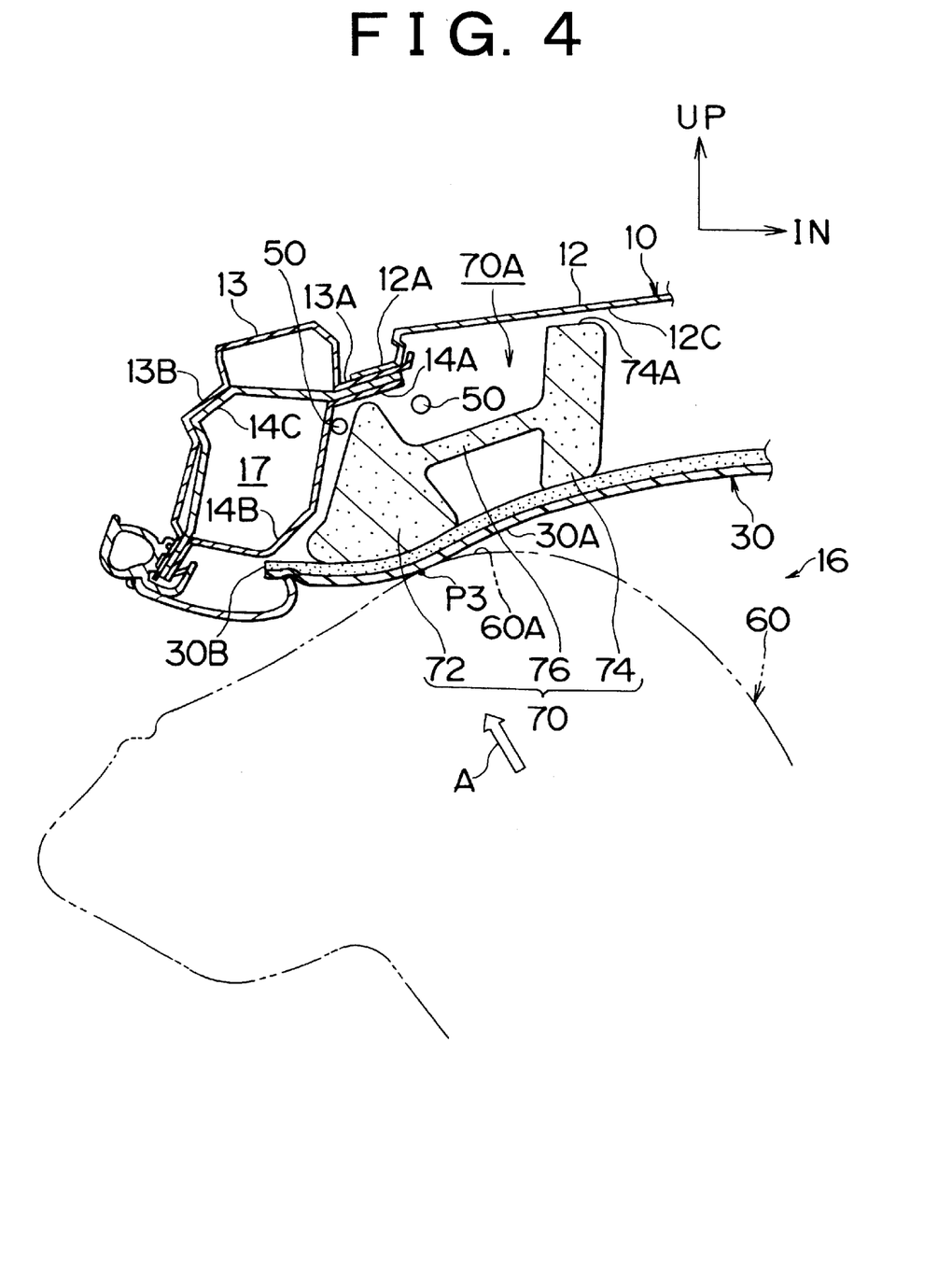
FIG. 4 is a cross-sectional view that relates to a modification of the second embodiment of the invention and that corresponds to FIG. 3.

In this embodiment, the third impact absorbing portion 76 of the impact absorbing member 70 is in contact with the roof head lining 30. For example, however, the third impact absorbing portion 76 of the impact absorbing member 70 may be provided at a position spaced from the roof head lining 30 as shown in FIG. 4.

Although the specific embodiments of the invention have been described in detail hereinbefore, the invention is not limited to those embodiments but can be modified in various manners within the spirit and scope thereof, as is apparent to those skilled in the art. For instance, in the above-described embodiments, the impact absorbing member 40 or the impact absorbing member 70 is disposed between the widthwise outward portion 30A of the roof head lining 30 and the roof side rail 14. Instead, as indicated by an alternate long and two short dashes line in FIG. 2, the impact absorbing member 40 or the impact absorbing member 70 may be disposed between a portion 30C that is in the roof head lining 30 and that is in front of the passenger compartment 16 and a window shield header panel (not shown) that is a skeletal member in a front upper region of the passenger compartment 16, or between a portion 30D that is in the roof head lining 30 and that is behind the passenger compartment 16 and a back window opening frame upper (not shown) that is a skeletal member in a rear upper region of the passenger compartment 16.

In the above-described embodiments, the impact absorbing members 40, 70 are formed from urethane foam. However, materials for the impact absorbing members 40, 70 are not limited to urethane foam but may be other foam materials including a bead foam material and so on. Instead of using foam materials, the impact absorbing members 40, 70 may be formed from other materials, such as a resinous material with a honeycomb structure.

What is claimed is:

1. An upper body structure of a motor vehicle, comprising:
   a roof;
   a ceiling member disposed over a passenger compartment at a predetermined distance from the roof; and
   an impact absorbing member that is disposed within the predetermined distance and that absorbs an impact resulting from a load from inside the passenger compartment,
   wherein the impact absorbing member has a first impact absorbing portion having a first thickness disposed between an outer peripheral portion of the roof and the ceiling member, a second impact absorbing portion having a second thickness disposed between the ceiling member and a position spaced from an outer peripheral portion of the roof towards a central portion of the roof, and a third impact absorbing portion that connects the first impact absorbing portion to the second impact absorbing portion and that has a third thickness that is less than the first thickness and the second thickness.

2. The upper body structure according to claim 1, wherein the third impact absorbing portion is in contact with the ceiling member.

3. The upper body structure according to claim 1, wherein the first impact absorbing portion has a first surface having a first size facing the roof and a second surface having a second size facing the ceiling member, and
   wherein the first size is less than the second size.

4. The upper body structure according to claim 1, wherein the outer peripheral portion of the roof has a skeletal member of the vehicle body,
   wherein a reinforcement is disposed at a position spaced from the skeletal member towards the central portion of the roof,
   wherein the first impact absorbing portion has a first surface that faces the skeletal member and that is substantially parallel to a surface of the skeletal member located inward of the passenger compartment and
   wherein the second impact absorbing portion has a second surface that faces the reinforcement and that is substantially parallel to a surface of the reinforcement located inward of the passenger compartment.

5. The upper body structure according to claim 1, wherein a wire harness is disposed between the third impact absorbing portion and the roof.

6. An upper body structure of a motor vehicle, comprising:
   a roof having a roof side portion;
   a ceiling member disposed over a passenger compartment at a predetermined distance from the roof; and
   an impact absorbing member that is disposed within the predetermined distance and that absorbs an impact resulting from a load from inside the passenger compartment,
   wherein the impact absorbing member has a first impact absorbing portion having a first thickness disposed between an outer peripheral portion of the roof side portion and the ceiling member, a second impact absorbing portion having a second thickness disposed between the ceiling member and a position spaced from an outer peripheral portion of the roof side portion towards a central portion of the roof, and a third impact absorbing portion that connects the first impact absorbing portion to the second impact absorbing portion and that has a third thickness that is less than the first thickness and the second thickness.

7. The upper body structure according to claim 6, wherein the third impact absorbing portion is in contact with the ceiling member.

8. The upper body structure according to claim 6, wherein the first impact absorbing portion has a first surface facing the roof having a first size and a second surface facing the ceiling member having a second size, and
   wherein the first size is less than the second size.

9. The upper body structure according to claim 6, wherein the roof side portion has a roof side rail as a skeletal member of the vehicle body,
   wherein a reinforcement is disposed at a position spaced from the roof side portion towards a central portion of the roof,
   wherein the first impact absorbing portion has a first surface that faces the roof side rail and that is substantially parallel to a surface of the roof side rail located inward of the passenger compartment, and
   wherein the second impact absorbing portion has a second surface that faces the reinforcement and that is substantially parallel to a surface of the reinforcement located inward of the passenger compartment.

10. The upper body structure according to claim 6, wherein a wire harness is disposed between the third impact absorbing portion and the roof.

11. An impact absorbing member inserted between a roof and a ceiling member of a vehicle, comprising:
    a first impact absorbing portion having a first thickness disposed between an outer peripheral portion of the roof and the ceiling member;
    a second impact absorbing portion having a second thickness disposal between the ceiling member and a position spaced from an outer peripheral portion of the roof towards a central portion of the roof; and
    a third impact absorbing portion that connects the first impact absorbing portion to the second impact absorbing portion and that has a third thickness that is less than the first thickness and the second thickness.

12. An impact absorbing member inserted between a roof having a roof side portion and a ceiling member of a vehicle, comprising:
    a first impact absorbing portion having a first thickness disposed between an outer peripheral portion of the roof side portion and the ceiling member;
    a second impact absorbing portion having a second thickness disposal between the ceiling member and a position spaced from an outer peripheral portion of the roof side portion towards a central portion of the roof; and
    a third impact absorbing portion that connects the first impact absorbing portion to the second impact absorbing portion and that has a third thickness that is less than the first thickness and the second thickness.

13. A vehicle comprising:
    a lower body structure and an upper body structure combined to define a passenger compartment;
    a roof;
    a ceiling member disposed over the passenger compartment at a predetermined distance from the roof; and
    an impact absorbing member that is disposed within the predetermined distance and that absorbs an impact resulting from a load from inside the passenger compartment,
    wherein the impact absorbing member has a first impact absorbing portion having a first thickness disposed between an outer peripheral portion of the roof and the ceiling member, a second impact absorbing portion having a second thickness disposed between the ceiling member and a position spaced from an outer peripheral portion of the roof towards a central portion of the roof, and a third impact absorbing portion that connects the first impact absorbing portion to the second impact absorbing portion and that has a third thickness that is less than the first thickness and the second thickness.

14. A vehicle comprising:
    a lower body structure and an upper body structure combined to define a passenger compartment;
    a roof having a roof side portion;
    a ceiling member disposed over the passenger compartment at a predetermined distance from the roof; and
    an impact absorbing member that is disposed within the predetermined distance and that absorbs an impact resulting from a load from inside the passenger compartment,
    wherein the impact absorbing member has a first impact absorbing portion having a first thickness disposed between an outer peripheral portion of the roof side portion and the ceiling member, a second impact absorbing portion having a second thickness disposed between the ceiling member and a position spaced from an outer peripheral portion of the roof side portion towards a central portion of the roof, and a third impact absorbing portion that connects the first impact absorbing portion to the second impact absorbing portion and that has a third thickness that is less than the first thickness and the second thickness.

15. An upper body structure of a motor vehicle comprising:
    a roof;
    a ceiling member disposed over a passenger compartment at a predetermined distance from the roof; and
    an impact-absorbing member that is disposed within the predetermined distance and that absorbs an impact resulting from a load from inside the passenger compartment,
    wherein the impact-absorbing member has a first impact-absorbing portion having a first surface having a first size facing the roof, and a second surface having a second size facing the ceiling member, and wherein the first size is less than the second size.

* * * * *

UNITED STATES PATENT AND TRADEMARK OFFICE
CERTIFICATE OF CORRECTION

PATENT NO. : 6,517,144 B2
DATED : February 11, 2003
INVENTOR(S) : Yasuo Kobayashi It is certified that error appears in the above-identified patent and that said Letters Patent is hereby corrected as shown below:

<u>Column 9,</u>
Lines 53 and 67, "disposal" should read -- disposed --.

Signed and Sealed this

Thirteenth Day of May, 2003

JAMES E. ROGAN
*Director of the United States Patent and Trademark Office*